3,154,167
AUTOMOBILE SAFETY BELT WITH IGNITION INTERLOCK
Edward J. Butler, North Providence, and Edward A. Butler, Providence, R.I., assignors, by direct and mesne assignments, to Electronics Research Corp., Providence, R.I., a corporation of Rhode Island
Filed May 13, 1963, Ser. No. 279,974
4 Claims. (Cl. 180—82)

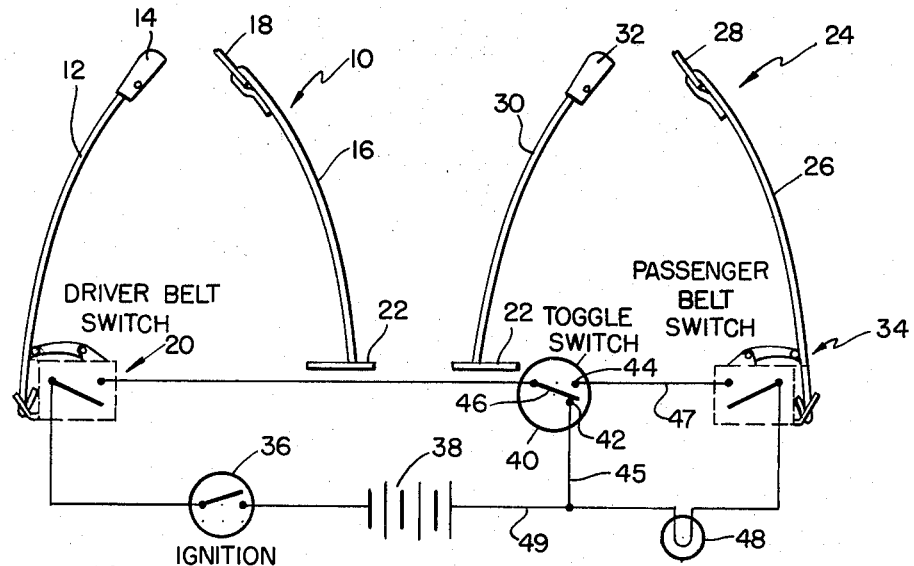
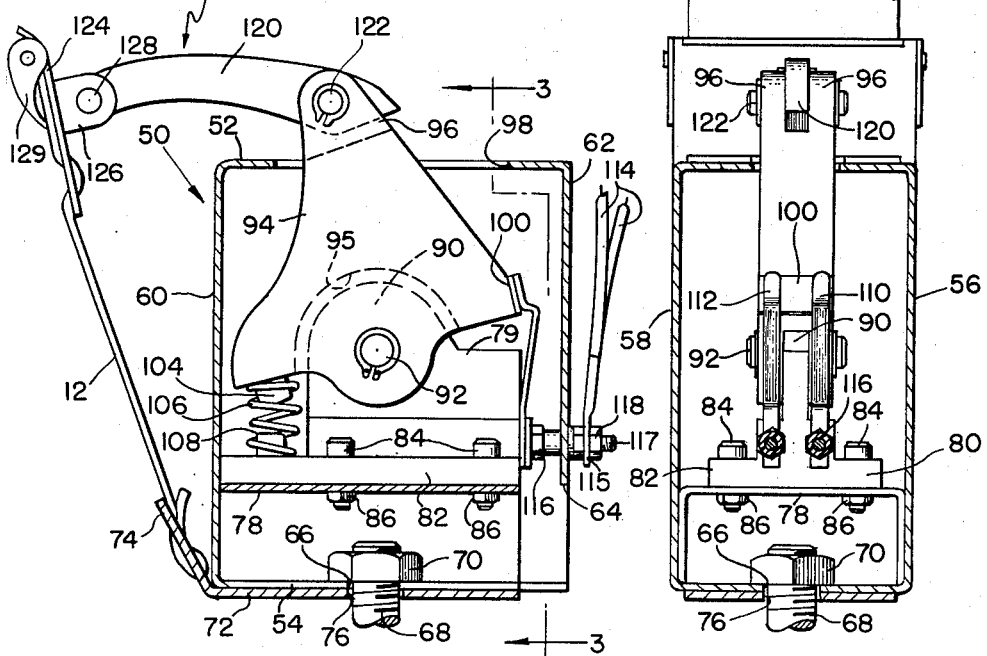

The present invention relates to an automobile safety belt with an ignition interlock. More particularly, the present invention relates to a safety belt assembly for use in an automobile that includes an electrical switch construction connected in circuit to the ignition of the automobile, the switch construction being operative to electrically connect the ignition in the ignition system of the automobile only when the safety belt is tightened around the occupant of the automobile.

The installation of safety belts in automobiles has become mandatory by law in many areas. The purpose of the safety belt in an automobile is, naturally, to reduce personal injury resulting from automobile accidents. Although many automobiles have safety belts installed therein, the automobile owner nevertheless fails to fasten the belt on many occasions and particularly on short runs such as are normally experienced in city driving. Some attempts have been made heretofore to modify the usual safety belt construction to insure that the belt will be tightened when the automobile is in use. However, prior to the instant invention, none of these heretofore known devices have proven effective in use or economical to manufacture. The present invention provides a practical solution to the problem of avoiding the use of the seat belt when the vehicle is in operation and includes a unique electrical switch that is interconnected to the seat belt and is further located in circuit with the ignition switch of the vehicle. The switch as contemplated for use in the present invention is preferably secured to the conventional anchor bolt located on the floor board or frame of the automobile, and thus may be adaptable for use with automobiles as presently manufactured. The switch is arranged such that the contacts thereof are normally open when the safety belt is loose or open. Since the contacts of the switch are open, the ignition circuit cannot be completed even if the ignition switch is closed by turning a key therein. Thus, when the safety belt is tightened to a predetermined tightness around the occupant of the automobile, the switch associated with the safety belt will function to close the contacts thereof, thereby completing the circuit to the ignition switch. When the ignition switch is closed by turning the key therein, the ignition circuit is completed, and the automobile may be started. If for any reason the safety belt is loosened or opened, the switch associated therewith will be rendered inoperative, wherein the circuit to the ignition switch will be opened to halt further operation of the automobile.

The present invention not only includes the use of a driver safety belt, but also the use of a passenger safety belt. Both the driver and passenger belts are adapted to be operated so that switches associated therewith are in the circuit with the ignition switch. By use of a toggle switch, the switch associated with the passenger belt may be removed from the ignition circuit so that fastening of the driver belt will enable the automobile to be operated.

Another novel detail associated with the present invention is the use of a load responsive element that is operative upon sudden impact, such as when the automobile is in collision, to open the safety belt switch, thereby opening the ignition circuit of the automobile.

It is therefore an object of the present invention to provide a safety belt for use in an automobile that is operable upon the fastening thereof around an occupant to close the circuit to the ignition switch, thereby enabling the automobile to be started.

Another object of the invention is to provide a safety belt for use in an automobile with an ignition interlock that includes a switch construction that is connected in circuit to the ignition of the automobile, the switch construction being operative to connect the ignition switch in the ignition circuit of the automobile only when the safety belt is firmly engaged around the occupant of the automobile.

Another object is to provide a safety belt switch assembly that is connectable to the conventional anchor bolt in an automobile, the switch contacts in said switch assembly being normally open and being closed only when the safety belt is drawn taut around the occupant associated therewith.

Still another object is to provide a safety belt and switch assembly for use in an automobile that includes a load responsive element that is adapted to open the switch contacts of the switch assembly when the automobile is subjected to sudden impact.

Still another object is to provide a plurality of safety belts for use in an automobile, each of said belts having a switch assembly associated therewith that is located in an ignition circuit, one of said switch assemblies being removable from the ignition circuit as desired.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a diagrammatic illustration of an ignition circuit of a vehicle and of a pair of safety belts normally utilized therein, switch assemblies being shown interconnected to the safety belts and in the ignition circuit;

FIG. 2 is a vertical sectional view of one of the switch assemblies associated with the safety belt illustrated in FIG. 1; and FIG. 3 is a sectional view taken along line 3—3 in FIG. 2.

Referring to the drawing and particularly to FIG. 1, a pair of seat belts are illustrated diagrammatically in the manner of use thereof in a vehicle such as an automobile. The seat belt generally indicated at 10 is located in association with the driver's seat of the automobile and includes a first flexible belt portion 12 to which a buckle 14 is secured, and a second flexible belt portion 16 to which a lock element 18 is secured that is adapted to cooperate with the buckle 14 for securing the safety belt 10 around the driver when he is located in the driver's seat. The first flexible belt portion 12 is interconnected to a switch assembly generally indicated at 20 and that is shown diagrammatically in FIG. 1. As will be described hereinafter, the switch assembly 20 is located in an ignition circuit which is also shown diagrammatically in FIG. 1. The second flexible belt portion 16 is connected to a conventional anchor bolt in the usual manner and thus is secured directly to the floor board or frame 22 of the automobile.

A second safety belt, generally indicated at 24, is designed for use in association with the passenger seat of the automobile and includes a first flexible belt portion 26 having a lock element 28 secured to the outer end thereof, and a second flexible belt portion 30 to which a buckle 32 is secured. The first flexible belt portion 26 of the safety belt 24 is associated with a switch assembly generally indicated at 34 while the second flexible belt portion 30 of the safety belt 24 is affixed to a conventional anchor bolt that is secured in the floor board or frame 22 of the vehicle. As will be described hereinafter, the switch construction 34 is adapted to be located in the automobile ignition circuit as desired, depending upon the occupancy of the passenger seat, thus rendering it possible to disconnect the passenger safety belt and switch assembly from the system if the driver is alone.

The ignition circuit is which the switch assembly 20 associated with the seat belt 10 is located is designed to be completed only if the safety belt 10 is fastened around the driver in taut relation. This safety feature is an inherent part of the invention, and, as will be described hereinafter, the safety belt 10 must be firmly fastened around the driver before the vehicle can be started.

As shown in FIG. 1, the switch assembly 20 is located in the ignition circuit that includes an ignition switch 36 and a source of power, such as the battery 38. It is understood that the other necessary components for use in a vehicle in the starting thereof would be located in the ignition circuit, but for purposes of illustrating the operation of the present invention, only the ignition switch 36 and the battery 38 are shown herein. The circuit further includes a toggle switch 40 that is electrically connected to the battery 38 and to the switch construction 20, the toggle switch being diagrammatically shown including a first contact 42, a second contact 44, and a switch arm 46. As illustrated in FIG. 1, the contact 42 is located in circuit with the battery 38 through a line 45 while the contact 44 is located in circuit with the switch assembly 34 through a line 47. The other side of the switch assembly 34 is connected to the battery through a line 49. An indicating lamp 48 may also be provided and is located in circuit with the switch assembly 34 and the battery 38. It is understood that the toggle switch 40 and the lamp 48 may be conveniently mounted on the dashboard of the automobile or any other convenient location. It is apparent that the closing of the ignition switch by the driver by turning a key therein will not necessarily close the ignition circuit for starting the automobile, since the switch assembly 20 is located in circuit therewith. Furthermore, when the toggle switch 40 has been moved to locate the switch arm 46 in engagement with the contact 44, the switch assembly 34 is also located in the ignition circuit, and it then becomes necessary to close the contacts in this switch assembly before the automobile may be started.

Referring now to FIGS. 2 and 3, the switch construction 20 is illustrated in more detail, and it will be understood that the switch construction 34 is constructed identically to the switch construction 20, the only difference being in the reversal of location of the parts associated therewith. As seen in FIGS. 2 and 3, the switch construction 20 includes a housing generally indicated at 50 that includes a top wall 52, a bottom wall 54, side walls 56, 58, rear wall 60, and front wall 62. The front wall 62 is broken away at the bottom thereof to define an opening 64, while the bottom wall 54 of the housing 50 is formed with a slot 66 therein that extends inwardly for a portion of the length thereof from the front of the housing. The opening 64 in the front wall 62 of the housing and the slot 66 provide for mounting of the housing 50 on an anchor bolt indicated at 68. The anchor bolt 68 is conventional in design and is normally associated with the frame or floor board of the automobile. A nut 70 threadably engages the anchor bolt 68 and is designed to lock the housing 50 in place on the automobile floor board.

Located below the bottom wall 54 of the housing 50 and secured to the anchor bolt 68 is an anchor strap 72 that is formed with an inclined upwardly extending portion 74 that projects rearwardly of the housing rear wall 60. The anchor strap 72 is provided with an opening 76 through which the anchor bolt 68 extends for locking the anchor strap in place.

Located within the housing 50 in close fitting relation with respect to the side walls 56 and 58 is a mounting bracket 78 on which a mounting element 79 formed with flanges 80 and 82 is secured. Bolts 84 extend through the flanges 80 and 82 and the bracket 78 and are engaged by nuts 86 for firmly mounting the mounting element in position on the bracket 78. As shown in FIGS. 2 and 3, the mounting element extends upwardly from the flanges 80, 82 and is formed with an upper curved extension 90. An opening is formed in the extension 90 for receiving a pin 92, the pin 92 further extending through suitable openings formed in a pivot element 94 that is formed with a curved slot 95 therein for receiving the extension 90 therein. The pivot element 94 further includes upwardly extending spaced ears 96 that extend through a slot 98 formed in the upper wall 52 of the housing 50. The forward end of the pivot element 94 adjacent the lower edge thereof has a contact 100 secured thereto, while the rearmost portion of the pivot element 94 adjacent the slot 95 has a downwardly projecting pin 104 located on the underside thereof for receiving a spring 106. The spring 106 is held in position on the lower end thereof by a similarly upwardly projecting pin 108 that is formed on a central shelf portion that is located between the flanges 80 and 82.

Secured to the front wall of the mounting element 79 are spaced contacts 110, 112 that are formed of a spring metal material and that are adapted to be located in engagement with the contact 100 when the pivot element 94 is moved in response to tightening of the safety belt 10. Each of the contacts 110, 112 is electrically connected to an electrical lead 114 and connector 115 through any suitable nut 116 and electrically insulated stud 117. The stud 117 projects through the front wall 62 of the housing 50 and is secured to the connector 115 by a lock nut 118.

In order to connect the pivotally mounted element 94 to the first belt portion 12 of the seat belt 10, a lever 120 is provided and extends between the spaced outwardly extending ears 96 of the pivotally mounted element 94. A shear pin 122, the purpose of which will hereinafter be described, locks the lever 120 between the ears 96 as illustrated in FIG. 3. The other end of the lever 120 is joined to a projection 126 of a fastening element 124 by a suitable pin 128. The flexible portion 12 of the belt 10 extends through the fastening element 124 and is normally locked in place therewith by a lock element 129. The lowermost end of the flexible belt portion 12 extends downwardly from the fastening element 124 and is secured to the inclined portion 74 of the anchor strap 72 in any suitable fashion.

The lever 120 is interconnected to the flexible belt portion 12 such that when the belt portion 12 is located in taut position the pivot element 94 is moved to the position illustrated in FIG. 2. The pivot element 94 in the position as illustrated in FIG. 2 has moved in opposition to the spring 106 thereby causing the contact 100 to be moved upwardly into engagement with the spaced spring contacts 110, 112. This completes a circuit through the spring contacts which in effect closes the circuit in the switch assembly 20. It is understood that the flexible belt portions 12 and 16 must be located in interengaged and taut relation before the pivot element 94 will be moved to the position illustrated in FIG. 2. Thus, only when the belt 10 is fastened tightly around the occupant of the driver's seat will the switch contacts in the switch assembly 20 be closed.

The switch assembly 34 is operative in a manner similar to that described above in connection with the switch construction 20, and the contacts therein will be closed only if the belt portions 26 and 30 are located in tight interengaging relation around the occupant of the passenger's seat.

In operation of the device, it wil first be assumed that only the safety belt 10 and switch construction 20 associated therewith will be in use. In this connection, the only occupant of the vehicle will be the driver. Since only the driver seat belt 10 will be used, the toggle switch is moved to the position illustrated in FIG. 1. In this position, the switch assembly 34 is disconnected from the ignition circuit. Since the switch assembly 20 is located in circuit with the ignition switch 36, it is apparent that the contacts therein must be closed before the ignition circuit can be completed when the ignition switch 36 is closed. The ignition circuit is preconditioned for completing by closing the contacts in the switch assembly 20, the switch contacts being closed when the belt portions 12 and 16 are joined in taut relation about the occupant of the driver's seat. When the flexible belt portion 12 is locked to the belt portion 16 around the occupant, the lever 120 is pivoted to move the pivot element 94 in a counterclockwise direction and against the action of the spring 106. This moves the contact 100 upwardly to bridge the space between the spring contacts 110 and 112, thereby completing the circuit to the ignition switch 36. When the driver turns the key to close the ignition switch 36, the ignition circuit is completed and the vehicle may be started. If for any reason the belt portion 12 is disconnected from the belt portion 16, the pivot element 94 will move in a clockwise direction under the action of the spring 106 to cause the contact 100 to move downwardly, thereby disconnecting the circuit between the spring contacts 110 and 112. The ignition circuit is then opened to prevent operation of the vehicle.

When a passenger is located in the passenger seat and it is desired to use the seat belt 24, the toggle switch 40 is actuated to move the contact arm 46 into engagement with the contact 44. This locates the switch assembly 34 in the ignition circuit so that it is now necessary for both seat belt 10 and seat belt 24 to be locked around their respective occupants before the ignition circuit can be completed. The lamp 48 will indicate that the passenger seat belt 24 is locked around the passenger when the toggle switch 40 has been moved to the passenger belt position. It is understood that the switch assembly 34 will operate in the manner as set forth above in connection with the switch assembly 20.

As illustrated and described, the contacts in the switch assemblies will make or break, depending upon whether the associated belt is connected or disconnected. However, it is conceivable that these contacts might wear or arc after some period of use. Accordingly, it is contemplated to utilize a mercury switch in the switch assemblies, the mercury switch being securable to the pivot element 94 and operable to make or break depending upon the position of the pivot element 94.

The present invention further includes a safety feature that provides for disconnecting the ignition circuit when the automobile is subjected to undue impact, such as when a collision occurs. For this purpose, the shear pin 122 that interconnects the lever 120 to the pivot element 94 is designed to shear under a predetermined load. This load may be determined so that only under severe impact will the shear pin break, and in the event that the automobile is in collission and the predetermined load is exceeded, the shear pin 122 will break, thereby disconnecting the lever 120 from the pivot element 94. The pivot element 94 will then return to the normal position thereof to open the ignition circuit. Since the ignition circuit is open, the dangers of the vehicle catching fire after collision will be eliminated. It will be noted that even though the lever 120 may be disconnected from the pivot element 94 when the shear pin 122 breaks, the belt portion 12 will still remain intact since the lower end thereof is secured to the anchor plate 72. The occupant of the automobile is thus safely retained in his seat by the seat belt, but the ignition circuit will be open.

As described above, the shear pin 122 is provided for breaking under a predetermined load when the vehicle is in collision. It is also contemplated to utilize an electrical device for disconnecting the switch assembly from the ignition circuit when the vehicle is in collision. In the alternate construction, a fuse is provided in the circuit in series with the contact 100. An additional ground contact is also provided that, when engaged by the contact 100, will cause a short in the circuit. When the vehicle is subjected to impact, the pivot element 94 will be pivoted in a counterclockwise direction further than normal to engage the ground contact. The circuit is then shorted to cause the fuse in the circuit to be blown, thereby automatically opening the switch assembly and the ignition circuit in which it is located.

The novel features of the safety belt with the ignition interlock and switch assembly associated therewith help render the vehicle theftproof and will prevent the occupants riding in the front seat of the automobile from sitting on their belts. Thus, the occupant's belt will have to be tightened before the vehicle will start. It is further apparent the use of the seat belts as contemplated in the present invention will eliminate the danger of children starting cars after their parents leave the vehicle.

As described herein, the switch assemblies 20 and 34 are normally placed within the automobile and secured to the anchor bolt 68 as described. However, it is also contemplated that the switch constructions be located below the floor boards at the anchor bolt points. This will eliminate the requirement of running wires inside the automobile to the switches and to the ignition circuit. In this alternate location of the switch assemblies, the necessary wiring will lead to the ignition circuit from under the floor boards of the automobile. It is also apparent that in the present invention the safety belts do not have any wires or leads running therethrough, and that once the switch assemblies are installed, they may be permanent and will require little or no maintenance.

Although the invention has been described as including an ignition circuit that automatically opens when the seat belt portions are released ("live" circuit), it is further contemplated that the circuit be modified, if so desired, to define a so-called "ground circuit," whereby the ignition circuit will not be broken, even if the seat belt is released, once the automobile has been started. Thus it would not be possible to start the vehicle unless the seat belt portions were fastened; however, if they were separated after starting, the automobile would not stall.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In an automotive vehicle having an ignition system and including a floor board upon which a seat is secured, an ignition switch electrically interconnected in said ignition system, a pair of anchor bolts secured to said floor board in spaced relation and adjacent said seat, a safety switch electrically interconnected in circuit with said ignition switch, and including an assembly that is anchored directly to one of said anchor bolts for mounting said safety switch in fixed relation on said floor board, a safety belt for attachment around an occupant of said seat including a first flexible portion that is interconnected to said switch assembly and a second flexible portion that is interconnected to the other of said bolts, said flexible portions being engageable under tension around the occupant of said seat, said switch assembly including a pivotally mounted element that is interconnected to the first flexible portion of said belt and that is pivotally movable when the belt portions are joined under tension around the occupant of said seat, said pivotally mounted element including contact means that is normally open when said belt portions are disconnected and that is responsive to the joining of said belt portions around said occupant and to the pivotal movement of said element to complete the circuit to said ignition switch, wherein the circuit in said ignition system is completed to enable said vehicle to be started.

2. In an automotve vehicle as set forth in claim 1, said switch assembly including a shear pin that is responsive to movement of said pivotally mounted element under a predetermined load caused by impact of said vehicle to break the electrical circuit between said safety switch and said ignition switch, wherein said ignition circuit is disconnected.

3. In an automotive vehicle as set forth in claim 1, said switch assembly defining a housing, and an anchoring flange engaging said housing and cooperating with the anchor bolt for said safety switch to locate said safety switch in proper position for securement to said first belt portion.

4. In an automotive vehicle as set forth in claim 3, the attachment of said housing to said anchoring flange and associated anchor bolt preventing relative movement of said safety switch with respect to said floor board, and said contact means and the circuitry associated therewith being independent of the flexible portions of said safety belt and the portions of said switch assembly that are subjected to tension when the safety belt is secured around the occupant of said seat.

References Cited in the file of this patent
UNITED STATES PATENTS

| | | |
|---|---|---|
| 2,240,085 | Wells | Apr. 29, 1941 |
| 2,510,115 | Jakosky | June 6, 1950 |
| 2,665,128 | Guffey | Jan. 5, 1954 |
| 2,777,531 | Erickson | Jan. 15, 1957 |
| 2,802,073 | Simon | Aug. 6, 1957 |
| 2,868,309 | Burgess | Jan. 13, 1959 |
| 3,047,689 | Vardara | July 31, 1962 |